May 3, 1932. A. DINA 1,857,116
PAD ROLLER MOUNTING FOR MOTION PICTURE PROJECTION MACHINES
Filed Dec. 28, 1929 5 Sheets-Sheet 4

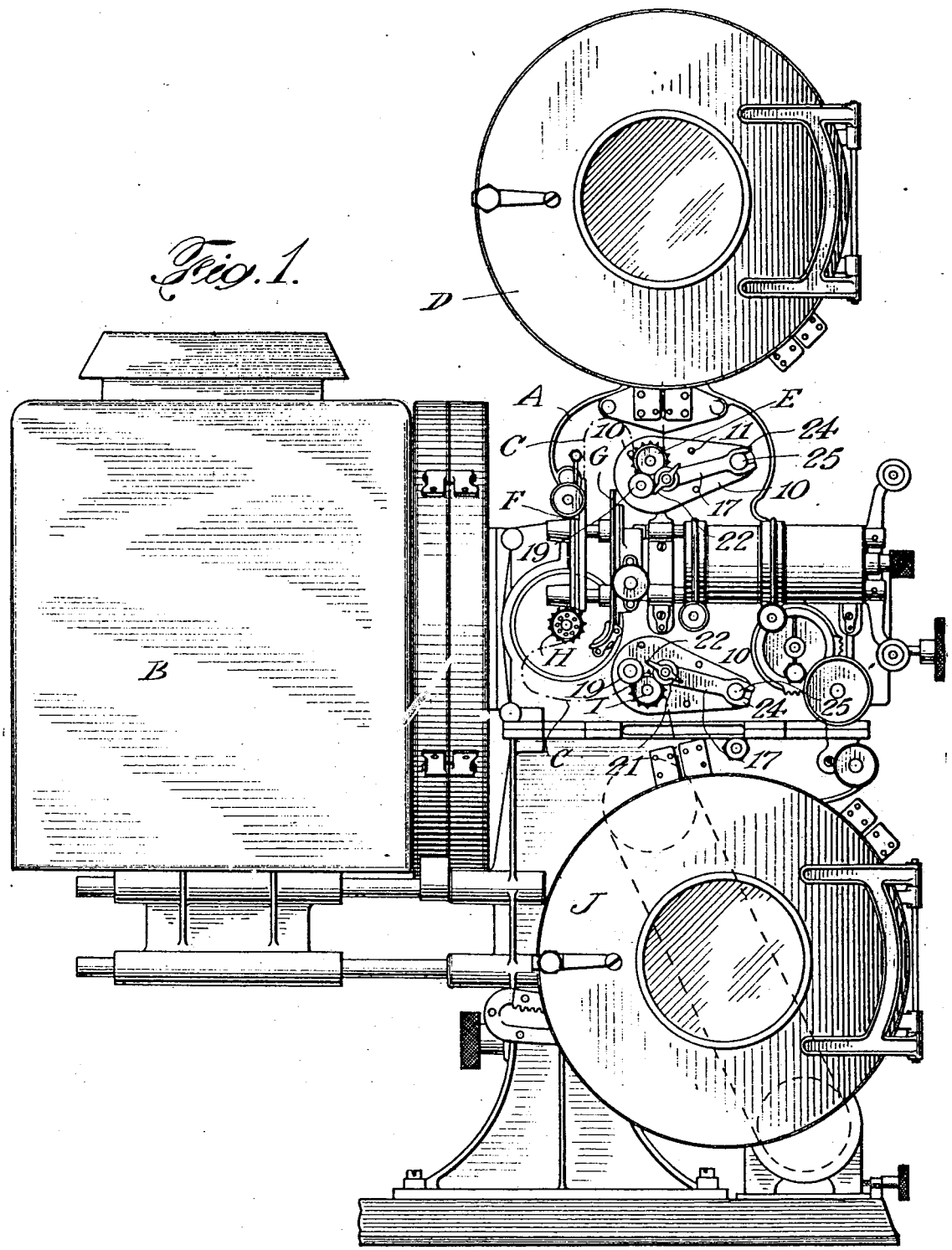

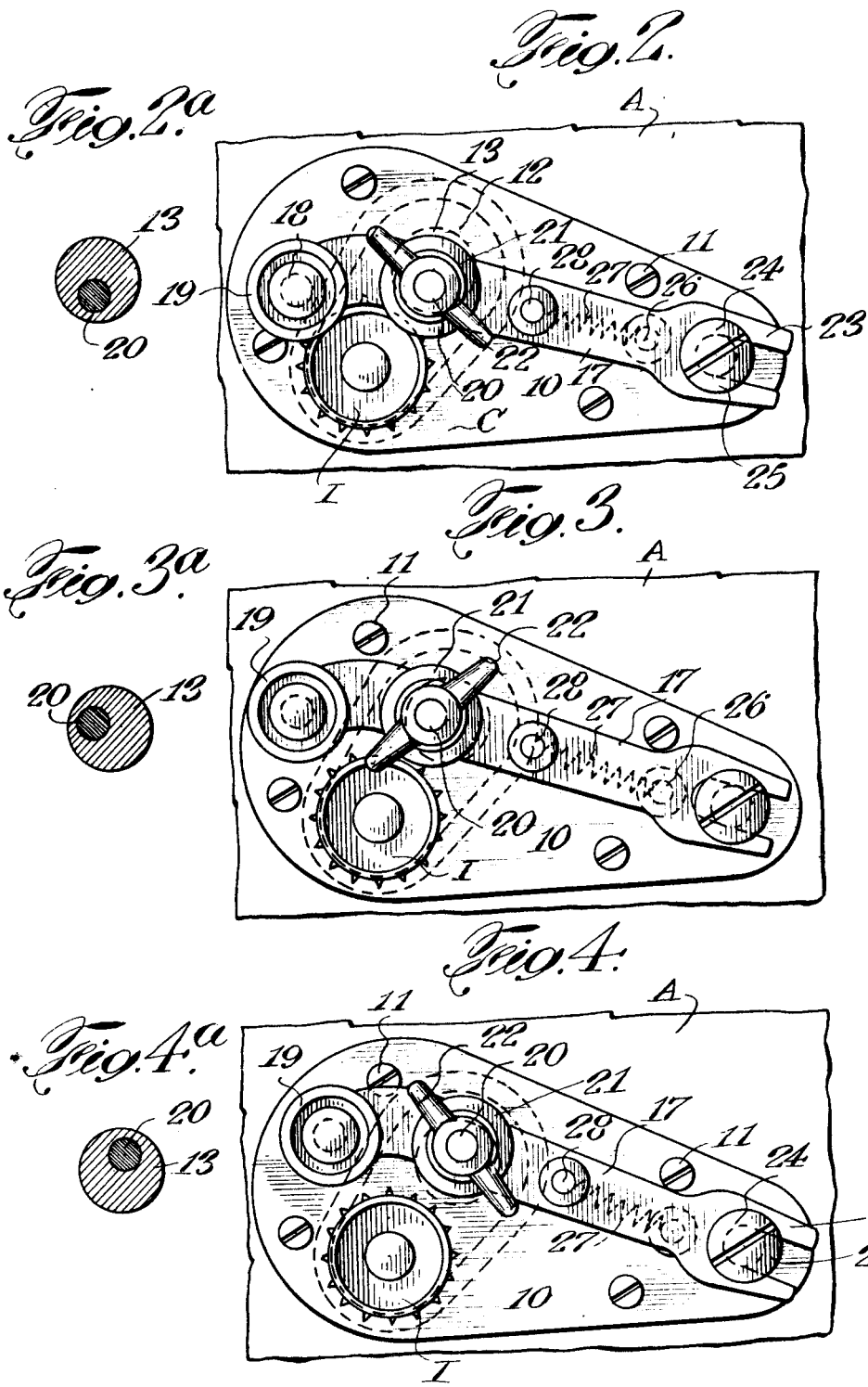

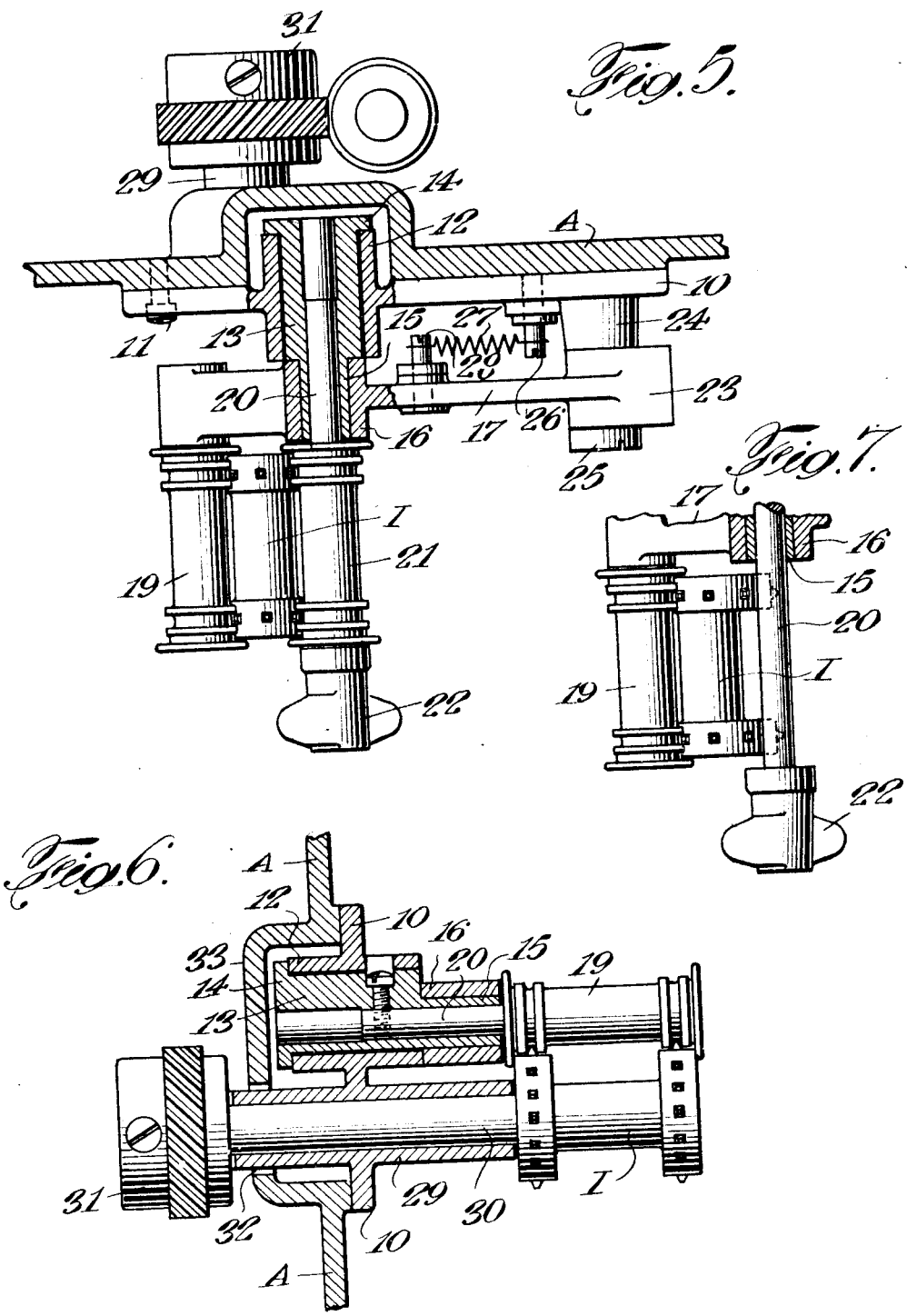

INVENTOR
Augusto Dina
BY
Howard W. Dix
ATTORNEY

May 3, 1932. A. DINA 1,857,116
PAD ROLLER MOUNTING FOR MOTION PICTURE PROJECTION MACHINES
Filed Dec. 28, 1929 5 Sheets-Sheet 5
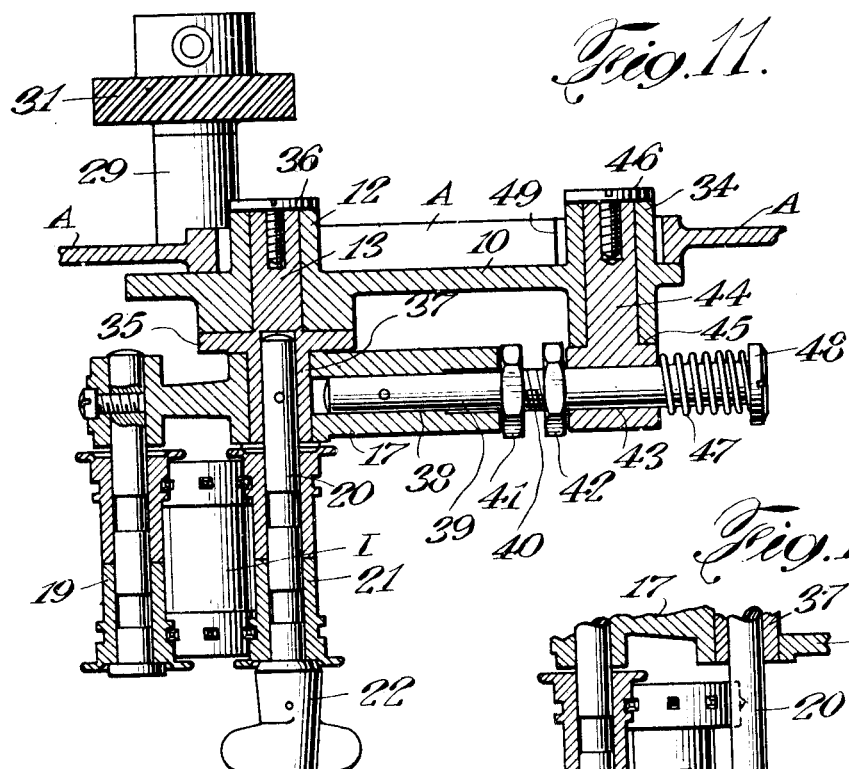
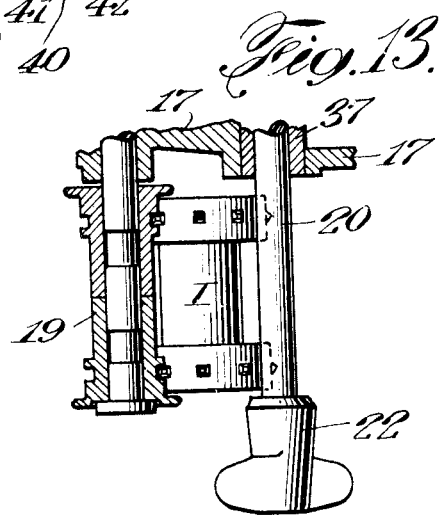
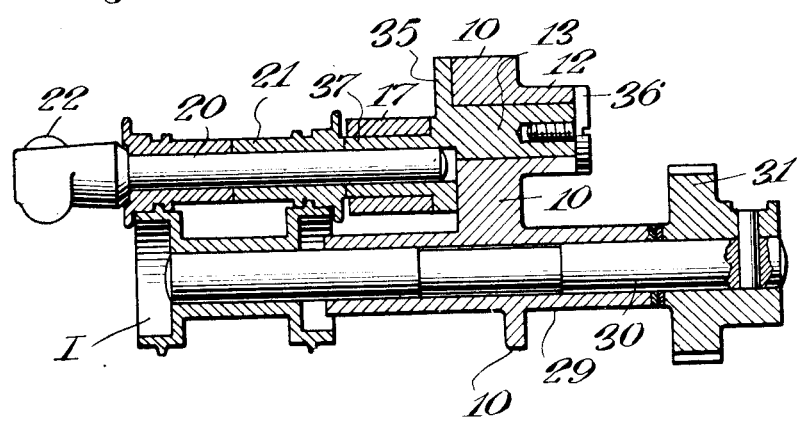
INVENTOR
Augusto Dina
BY
Howard W Dix
ATTORNEY Patented May 3, 1932

1,857,116

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

PAD ROLLER MOUNTING FOR MOTION PICTURE PROJECTION MACHINES

Application filed December 28, 1929. Serial No. 417,119.

This invention relates to mountings for pad rollers and has especial reference to such mountings as are adaptable for use in film carrying machines, such as cameras, projectors, and printing, cleaning, and other like machines.

A main object of the invention is to provide an improved simple, efficient, durable, and easily operated mounting for rollers on cameras or motion picture projectors and the like such as those rollers which engage and hold the film in its passage in contact with the several sprockets within the camera or projection head or other film carrying apparatus.

A further object is to provide a simple and easily operated means whereby the roller may be quickly engaged with and disengaged from the film.

A still further object is to provide such a mounting as can be manually operated with a minimum of trouble and time and which will automatically restore the roller to one or another position when the manually operable means is released so that the roller is always, when not engaged by the hand of the operator, in one position or another.

Further and more specific objects, features, and advantages will more clearly appear from the detailed description given below when taken in connection with the accompanying drawings which form part of the invention and which illustrate one present preferred form of the invention.

The invention considered in general terms comprises a simple mounting for the pad roller or rollers which is practically a self contained unit which may be readily attached, in the case of a picture projection machine, to the projection head plate thereof. The unit comprises means further to permit the roller to be manually moved from engagement with the film and the film sprocket when desired, but is designed so that when the hand which operates it, is released, the roller will spring or be snapped to one position or another. The two positions generally occupied by the roller are, the first or operative position in which it is engaged with the film, and the other and inoperative position in which it is removed from engagement with the film to permit the threading of the film through the machine. It is desired to provide means whereby when the hand is released and the roller is intermediate these two positions, it will be snapped back to one of them depending upon its relative position to these two positions at the moment of release. Thus, the operator merely has to remove the roller from the position in which he finds it a definite distance whereupon he can remove his hand and the roller will snap to the desired position without any further attention on his part, and be positioned positively therein.

The invention further contemplates a construction which is simple and self contained as above mentioned and which can be separately assembled practically in its entirety and attached to or removed from the machine without the other mechanism on the machine being disturbed or requiring their disarrangement only to the very slightest extent.

The preferred present form of the invention is shown in the drawings of which,

Fig. 1 is a side elevation of a projector embodying the invention;

Fig. 2 is a side elevation of the pad roller construction with the roller lying near the film;

Fig. 2a is a cross section through the bearing in the position of the parts shown in Fig. 2;

Fig. 3 is a side elevation showing the parts when the roller is part way withdrawn from the film;

Fig. 3a is a cross section through the bearing in the position of the parts shown in Fig. 3;

Fig. 4 is a side elevation with the roller completely withdrawn from the film;

Fig. 4a is a cross section through the bearing in the position of the parts shown in Fig. 4;

Fig. 5 is a plan view partly in section through the pad roller construction;

Fig. 6 is a cross section through the structure shown in Fig. 5;

Fig. 7 is a partial plan view of a modified form of the invention;

Fig. 11 is a horizontal section through the form of the invention shown in Fig. 8;

Fig. 12 is a similar view through Fig. 8 but a cross section through the same construction; and, Fig. 13 is a partial horizontal section through a modified form of the invention shown in Fig. 8.

Figure 8A:
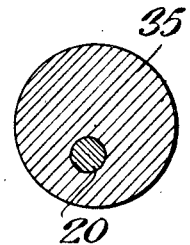
Fig. 8a is a cross section through the bearing in the position of the parts shown in Fig. 8.

As shown in the drawings, the present preferred form of the invention is applied to a projector including the head A and the lamp housing B. The course of the film C is indicated by the dot and dash lines in the drawings and follows the usual course from the upper magazine D around the upper sprocket E down between the gate F and door G to the intermittent sprocket H, thence around the lower sprocket I and then to the lower magazine J.

Because the lower and upper sprockets I and E are identical except for the reversal of their relations with their respective pad rollers, the detailed construction of the pad roller associated with the lower sprocket I will be hereinafter described since except for this reversal the constructions are practically the same.

As shown in Figs. 2 to 6 inclusive, the relation of the pad roller or rollers to the lower sprocket wheel I is therein indicated and comprises a plate 10 which is fastened to the projector head frame A by suitable means such as screws 11. The plate 10 is provided with a journal element 12 in the form of tubular member extending at right angles to the plane of the plate 10. In this journal element there is disposed a bearing sleeve 13 having at one end a flange 14 bearing against the outer face of the journal and at the other end a reduced portion 15 on which is slid a sleeve-like portion 16 disposed on a pad roller supporting arm 17.

At one end, this arm 17 supports a transverse shaft 18 on which is mounted loosely a pad roller 19. Disposed eccentrically in the bearing sleeve 13 and fixed therein is the end of a shaft 20 the other end of which extends beyond the sleeve 13 and supports another pad roller 21, which is loosely disposed thereon for rotation. The end of the shaft 20 has fastened thereto a handle or finger grip 22 whereby the shaft 20 may be manually turned.

The other end of the arm 17 is preferably in the form of a yoke element 23 which straddles a suitable guide such as stub shaft 24 projecting from the plate 10 and is held on the shaft by means of a cap 25. A pin 26 on the plate 10 supports one end of a spring 27 the other end of which is attached to a pin 28 on the arm 17. This spring 27 at all times tends to pull the arm 17 to the right and to keep it either in the operative or inoperative position.

As seen particularly in Fig. 6, the plate 10 also has a journal sleeve 29 which acts as a support for the shaft 30 on one end of which is fixed the sprocket wheel I and on the other end of which is disposed the operating gear 31. The shaft 30 and the sleeve 29 project through a suitable opening 32 in the projector frame A which at this point is provided with the off-set or recessed portion 33. Into this recess 33 also projects the ends of the journal 12 and bearing element 13 as seen clearly in Figs. 5 and 6.

In the modified form shown in Fig. 7 the construction is the same except that the roller 21 is removed from the shaft 20 and this shaft merely acts as a means whereby the bearing member can be turned to operate the arm 17.

Assuming the parts of this form of the invention are in the position shown in Fig. 2, which is the position in which the rollers 19 and 21 are lying closely adjacent the film C, it will be observed that the pull of the spring 27 along the arm 17 is below the center of rotation of the bearing sleeve 13 as shown in Fig. 2a. This therefore tends to hold the arm in this lower position wherein the axis of the shaft 20 is below the center as above mentioned. This action will thus hold the rollers 19 and 21 in a position adjacent the film C.

When the handle 22 is turned clock-wise from the position shown in Fig. 2 to the position shown in Fig. 3, then the shaft 20 will be turned in this direction and will rotate the bearing sleeve 13 in the journal 12 until the center of the bearing sleeve 13 and the axis of the shaft 20 are disposed as shown in Fig. 3a in line with the pull of the spring 27 on what is known as dead center wherein the tendency of the spring 27 to pull the arm to one position or another will have no effect. However, if the handle is moved just a little way in either direction from the position shown in Fig. 3 and 3a the spring will take effect. For instance, if the clockwise movement of the handle is continued from that shown in Fig. 3 then the spring will take effect and the arm and the associated parts will be moved to the position shown in Figs. 4 and 4a in which the axis of the shaft 20 will be above the center of rotation of the bearing sleeve 13 and the rollers 19 and 21 will be in their inoperative position away from the sprocket I and the film C. From dead center position shown in Fig. 3, a slight movement in either direction of the handle will cause the arm to be snapped to either an operative or an inoperative position as shown depending upon the direction of movement of the handle and the bearing sleeve 13 from the dead center position. In the position shown in Fig. 4 the arm is moved to the extreme right and the yoke slot is preferably bearing against the stud shaft 24 which limits further movement of the arm in this direction. Thus there is provided a simple and efficient means whereby a pad roller or rollers may be manually operated to move it to or from the vicinity of the sprocket and the film and which will automatically move or be snapped quickly to one or another position when the manually operable means is released.

Figure 8:
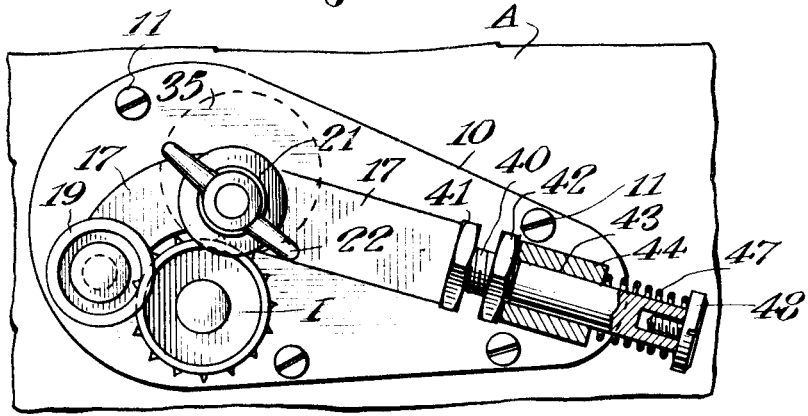
Fig. 8 is a side elevation of a further modification of the invention showing the rollers in proximity to the film.
Figure 9A:
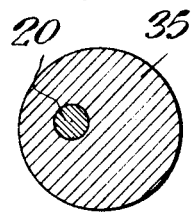
Fig. 9a is a cross section through the bearing in the position of the parts shown in Fig. 9.
Figure 9:
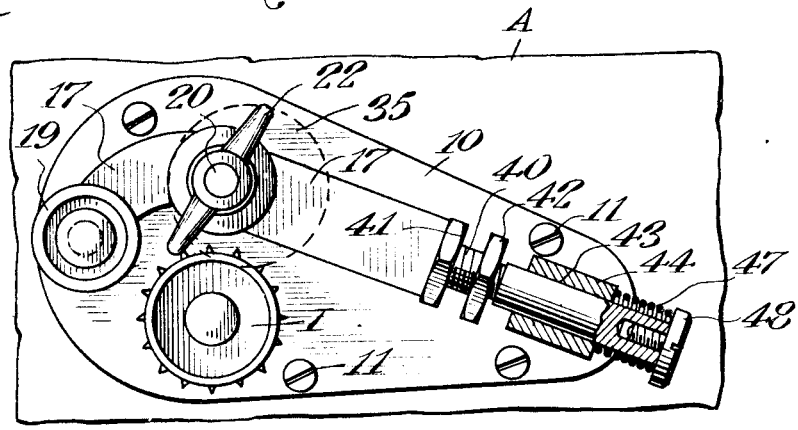
Fig. 9 is a side elevation showing the rollers partly withdrawn from the film.
Figure 10A:
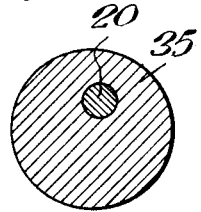
Fig. 10a is a cross section through the bearing in the position of the parts shown in Fig. 10.
Figure 10:
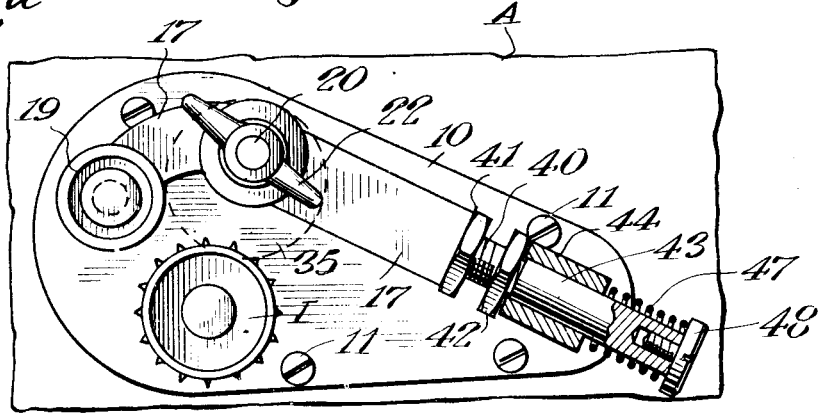
Fig. 10 is a side elevation showing the rollers completely withdrawn from the film.

The modification of the invention shown in Figs. 8 to 12 comprises as before the projector head frame A and the plate 10 attached thereto. This form of the plate 10 has two tubular journal members such as 12 and 34. As before the journal member 12 supports the bearing sleeve 13 having a flange 35 at one end and a cap 36 at the other end. As shown in Fig. 12 this flange or plate 35 has a laterally extending bored portion 37 which within its bore receives the end of the shaft 20. The bore and the shaft 20 are disposed or alined off-center with respect to the center of the bearing sleeve 13 as before. The shaft supports loosely the roller 21 and has on its outer end the operating handle 22.

The outer surface of the extension 37 receives the sleeve-like portion 16 on the roller supporting arm 17. In the present form the arm to the right is provided with a bore 38 within which is fixed the end of the shaft 39. The shaft 39 beyond the end of the bore 38 is threaded as at 40 and this portion receives a lock nut bearing against the end of the bored arm portion 17 and another adjustable lock nut 42 spaced therefrom a desired distance. The outer end of the shaft 39 extends through a bore 43 in a bearing member 44 having a shoulder 45 bearing against one face of the journal member 34. The bearing member 44 extends into and rests in the journal member 34 and the outer end of it has a cap plate thereon to hold the bearing member 44 in position in the journal member 34. The end of the shaft 39 beyond the bearing member 44 is surrounded by a spring 47 one end of which bears against the adjacent face of the bearing member 44 and the other end of which bears against the adjacent face of a cap plate 48. The shaft 39 slides in the bearing member 44 and its movement is resisted by the spring 47 in any attempt to move it from either the operative or inoperative extreme position. The construction and arrangement of the sprocket wheel I and its associated parts are substantially the same as for the previously described construction.

In the form shown in Fig. 13, the modification is the same as that described in the last described figures except that the roller 21 is omitted from the shaft 20.

In the operation of the forms of the inventions shown and described with reference to Figs. 8 to 13 inclusive, the handle 22 is again operated to move the pad rollers 19 and 21 from their position against or adjacent the film C by turning the handle 22 clock-wise. When the parts are in the position shown in Fig. 9 the dead center above mentioned is reached and any slight movement of the parts in either direction from this position will snap the arm 17 to the operative or inoperative position. Further clock-wise movement of the handle 22 will bring the axis of the shaft 20 above the dead center line and the spring 47 will snap it to the position shown in Fig. 10. Movement of the axis of the shaft 20 below the dead center position will cause it to be snapped to the operative position shown in Fig. 8. In either of the two extreme positions of the arms 17 its position can be varied and adjusted by means of the lock nuts 41 and 42, so that the throw of the arm can be lengthened or shortened as may be desired. This adjusting means will therefore permit the distance of the rollers from the sprocket to be nicely adjusted so that various circumstances can be met. For instance, in an ordinary film the thickness is generally about .007 inches but if it is patched, it may be as much as .014 inches. The film also is normally intended to be run or disposed tight against the bottom of the teeth on the sprocket so that the distance of the farther side of the film from the sprocket bottom, allowing for patches and play, may be as much as .021 inches. The rollers may by the means above described be adjusted to any one or more of these desired measurements and for the purposes mentioned. In this modified form the frame A has a cut away portion 49 through which certain parts project as clearly shown in Fig. 11.

The invention above described therefore will provide a simple self-contained unit including a pad roller mounting which can be readily attached to and removed from the head frame without disturbing the other mechanism to any appreciable extent; the pad rollers may be easily operated to move them to the desired operative or inoperative position; the movement of them to either position is accomplished in a manner which is positive and partially automatic; the rollers may be adjusted with nicety to space them the exact distance from the bottom of the sprocket; the operation of the rollers is accomplished with a minimum of effort on the part of the operator; the construction is such that it is as easily applicable to any film carrying machine as it is to motion picture projectors.

While the invention has been described in detail and with respect to a present preferred form thereof, it is not to be limited to such forms or details since many changes and modifications may be made and the invention embodied in other forms and modifications without departing from the spirit and scope of the invention in its broadest aspects. Hence it is desired to cover any and all forms and modifications coming within the language or scope of any one or more of the appended claims.

What is claimed, is,

1. A pad roller mounting construction for motion picture machines which comprises a plate having a journal therein, a bearing movably disposed in said journal, a pad roller supporting arm eccentrically supported from said bearing, means for moving the bearing to move the arm to predetermined normal positions, and means for automatically restoring the arm to one or the other of said normal positions when the hand is released.

2. A pad roller mounting construction for motion picture machines which comprises a support having a journal therein, a bearing rotatively disposed in said journal, a pad roller arm having predetermined positions eccentrically supported on the bearing, a yoke on said arm engaging said support to permit sliding movement of the arm, a spring extending between the support and the arm to tend to move the arm in one position or another, means for manually moving the bearing to move the arm, said spring adapted to restore the arm to one or the other of said predetermined positions when the hand is released.

3. A pad roller mounting construction for motion picture machines which comprises a support having a journal therein, a bearing rotatively supported in said journal, a pad roller arm eccentrically supported on the bearing, a yoke on said arm engaging said support to permit sliding movement of the arm, a spring extending between the support and the arm to tend to move the arm in one direction, a shaft extending from the bearing and fixed therein, a roller loosely supported on said shaft, and manually operable means on the end of said shaft to turn the bearing to move the arm.

4. A pad roller mounting construction for motion picture machines which comprises a support, a journal therein, a bearing rotatively disposed in said journal, a pad roller arm having predetermined positions eccentrically disposed on said bearing, one end of the arm slidably engaged with a suitable support, a spring engaging the arm and tending to move it to one position or another, means for manually turning the bearing, said spring adapted to return the arm to one or the other of said predetermined positions when the hand is released.

5. A pad roller mounting construction for motion picture machines which comprises a support having a journal therein, a bearing rotatively disposed in said journal, a pad roller arm having predetermined positions eccentrically disposed on said bearing, one end of the arm slidably engaged with a suitable support, a spring engaging the arm and tending to move it to one position or another, a shaft extending from the bearing and fixed thereto, means for manually turning the shaft, a pad roller loosely supported on said shaft, said spring adapted to restore the arm to one or the other of said predetermined positions when the hand is released.

6. A pad roller mounting construction for motion picture machines which comprises a support having a journal therein, a bearing rotatively disposed in said journal, a pad roller arm eccentrically disposed on said bearing, one end of the arm slidably engaged with a suitable support, a spring disposed between the support and the end of the arm and tending to move the arm in predetermined directions, a shaft extending from the bearing and fixed thereto, means for manually turning the shaft, a pad roller loosely supported on said shaft, said spring adapted to restore the arm to predetermined positions when the hand is released, and means for adjusting the position of the arm in the predetermined positions.

In testimony whereof, I have hereunto set my hand.

AUGUSTO DINA.